United States Patent
Dai et al.

(10) Patent No.: US 12,466,806 B2
(45) Date of Patent: Nov. 11, 2025

(54) 2-SUBSTITUTED IMIDAZOLIDINE DERIVATIVE CONTAINING ARYL BIPYRIDYLOXY STRUCTURE AND PREPARATION METHOD AND USE THEREOF

(71) Applicant: NANTONG UNIVERSITY, Jiangsu (CN)

(72) Inventors: Hong Dai, Jiangsu (CN); Ruijian Yan, Jiangsu (CN); Heyi Miao, Jiangsu (CN); Zhipeng Wang, Jiangsu (CN); Dandan Zheng, Jiangsu (CN); Yan Zhang, Jiangsu (CN); Zichan Zhang, Jiangsu (CN); Lei Shi, Jiangsu (CN); Jianhua Li, Jiangsu (CN); Haijun Zhang, Jiangsu (CN)

(73) Assignee: NANTONG UNIVERSITY, Nantong (CN)

( * ) Notice: Subject to any disclaimer, the term of this patent is extended or adjusted under 35 U.S.C. 154(b) by 917 days.

(21) Appl. No.: 17/633,898

(22) PCT Filed: Aug. 25, 2021

(86) PCT No.: PCT/CN2021/114510
§ 371 (c)(1),
(2) Date: Feb. 8, 2022

(87) PCT Pub. No.: WO2022/048479
PCT Pub. Date: Mar. 10, 2022

(65) Prior Publication Data
US 2022/0267297 A1    Aug. 25, 2022

(30) Foreign Application Priority Data

Sep. 7, 2020 (CN) .......................... 202010925969.5

(51) Int. Cl.
*C07D 401/06* (2006.01)
*A01N 51/00* (2006.01)
*A01P 7/04* (2006.01)

(52) U.S. Cl.
CPC ........... *C07D 401/06* (2013.01); *A01N 51/00* (2013.01); *A01P 7/04* (2021.08)

(58) Field of Classification Search
CPC ......... C07D 401/06; A01P 7/04; A01N 43/50; A01N 51/00
See application file for complete search history.

(56) References Cited

FOREIGN PATENT DOCUMENTS

CN      104119316       * 10/2014

OTHER PUBLICATIONS

CN 104119316 (Nantong University, Oct. 29, 2014) (Year: 2014)—English translation.*
Patani, Chem Rev 1996 (Year: 1996).*
Lazzara, RSC Medicinal Chemistry, 11, p. 18-29, 2020 (Year: 2020).*
CN 104119316, 2014 (English translation) (Year: 2014).*
Patani et al. (Chem Rev. 1996, 96, 3146-76). (Year: 1996).*

* cited by examiner

*Primary Examiner* — Umamaheswari Ramachandran
(74) *Attorney, Agent, or Firm* — Welsh Flaxman & Gitler LLC

(57) ABSTRACT

The present disclosure relates to a 2-substituted imidazolidine derivative containing an aryl bipyridyloxy structure, and a preparation method and use thereof, which is obtained by the reaction of 2-substituted imidazolidine and aryl bipyridyloxy compound. The 2-substituted imidazolidine derivative containing an aryl bipyridyloxy structure has a good insecticidal effect on harmful insects, and the compound can be used to prepare insecticides in the fields of agriculture, horticulture, etc.

15 Claims, No Drawings

2-SUBSTITUTED IMIDAZOLIDINE DERIVATIVE CONTAINING ARYL BIPYRIDYLOXY STRUCTURE AND PREPARATION METHOD AND USE THEREOF

CROSS REFERENCE TO RELATED APPLICATION

This patent application claims the benefit and priority of Chinese Patent Application No. 202010925969.5 filed on Sep. 7, 2020, the disclosure of which is incorporated by reference herein in its entirety as part of the present application.

TECHNICAL FIELD

The present disclosure relates to the field of chemical pesticides, in particular to a 2-substituted imidazolidine derivative containing an aryl bipyridyloxy structure, and a preparation method and use thereof.

BACKGROUND ART

Pest control is an important part of scientific research on pesticides. Pests are effectively controlled due to the use of insecticides. In recent years, some pests have developed resistance to traditional insecticides. This requires the development of new insecticides with high efficiency and low toxicity.

The 2-substituted imidazolidine ring is an important nitrogen heterocycle, and the 2-substituted imidazolidine derivatives play an important role in the field of plant protection, e.g. imidaclothiz has good insecticidal activity.

Aryl bipyridyloxy is also an important nitrogen-containing heterocyclic skeleton, and also has important applications in insecticide and weed control.

SUMMARY

In order to find new compounds with excellent biological activity from the 2-substituted imidazolidine compounds, the aryl bipyridyloxy group and the 2-substituted imidazolidine unit are organically combined together. The present disclosure discloses a 2-substituted imidazolidine derivative containing an aryl bipyridyloxy structure with agricultural insecticidal application value.

The purpose of the present disclosure is to provide a 2-substituted imidazolidine derivative containing aryl bipyridyloxy structure with good insecticidal activity against various pests, so as to meet the demand for high-efficiency insecticides in crop protection.

Another object of the present disclosure is to provide the use of the above compounds in the preparation of insecticides.

Another object of the present disclosure is to provide a method for preparing the above compound.

In order to solve the above technical problems, according to the first aspect of the present disclosure, a 2-substituted imidazolidine derivative containing an aryl bipyridyloxy structure is provided, wherein having a structure represented by general formula I,

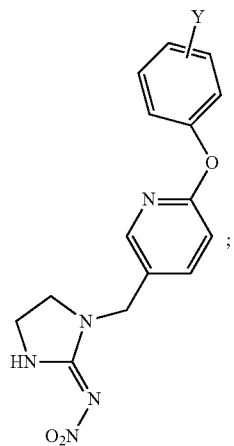

general formula I

In the general formula I, Y includes 4-F, 4-Cl, 4-Br, H, 2, 4-$Cl_2$, 2, 3-$F_2$.

In some embodiments, the structure of the 2-substituted imidazolidine derivative containing an aryl bipyridyloxy structure is as follows:

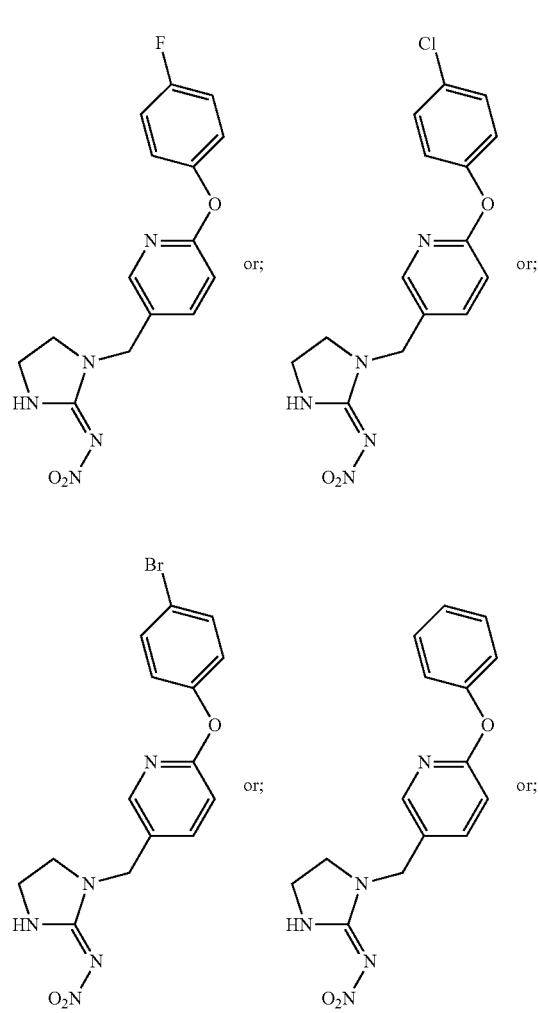

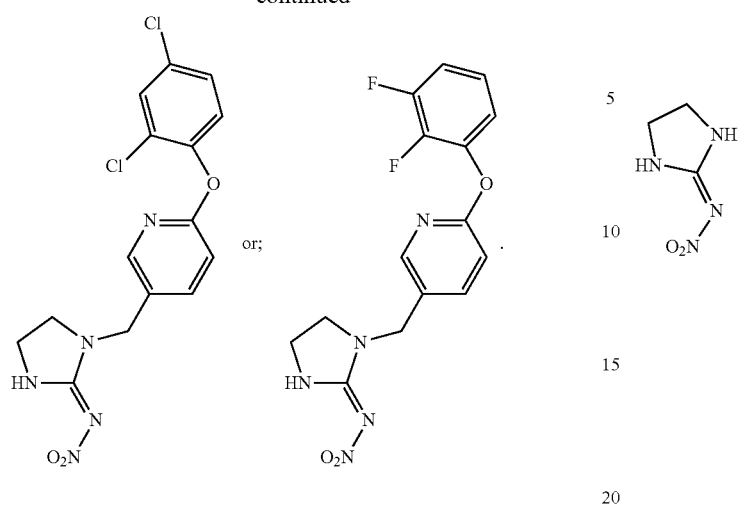
According to the second aspect of the present disclosure, a method for preparing the 2-substituted imidazolidine derivative containing an aryl bipyridyloxy structure is provided, wherein comprising the following steps:
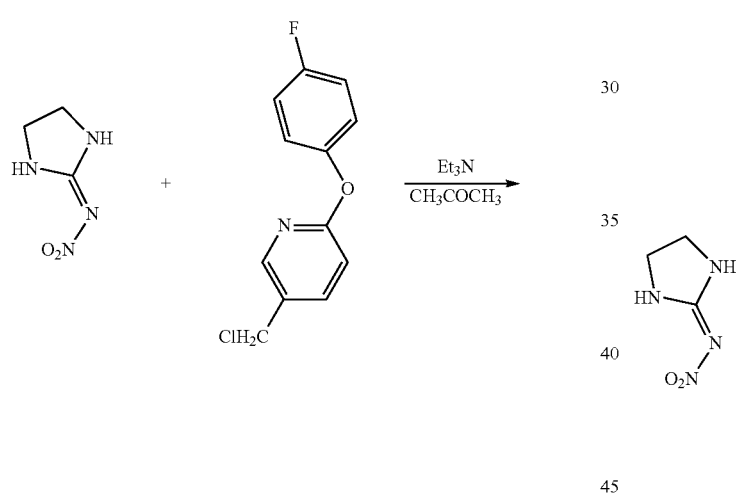
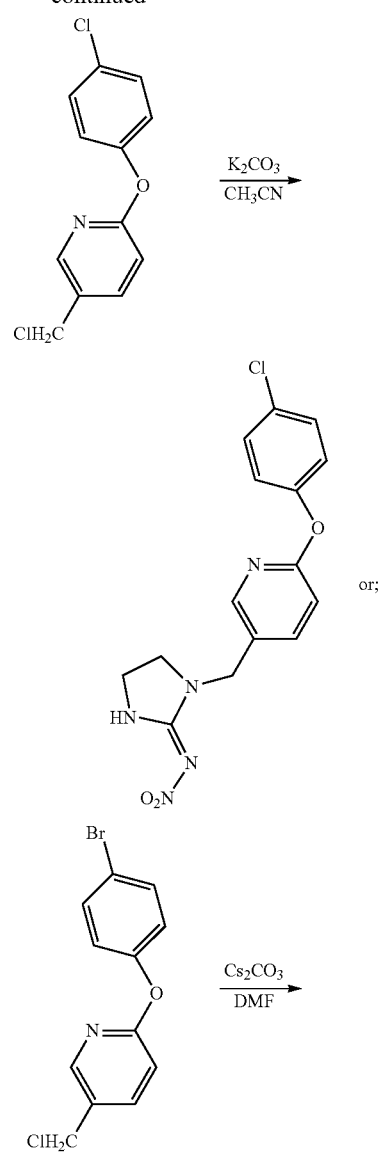
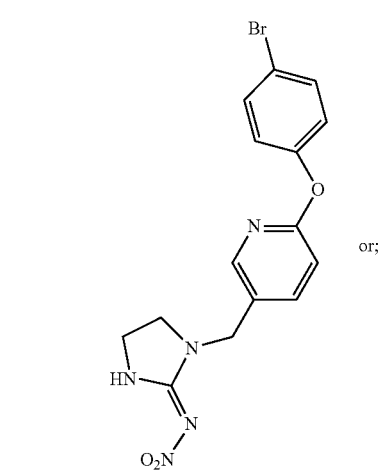

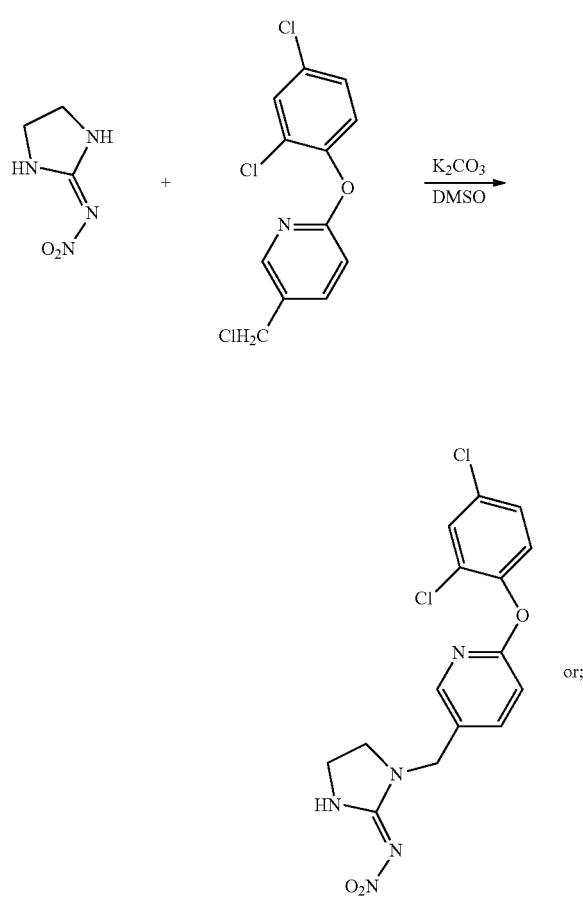

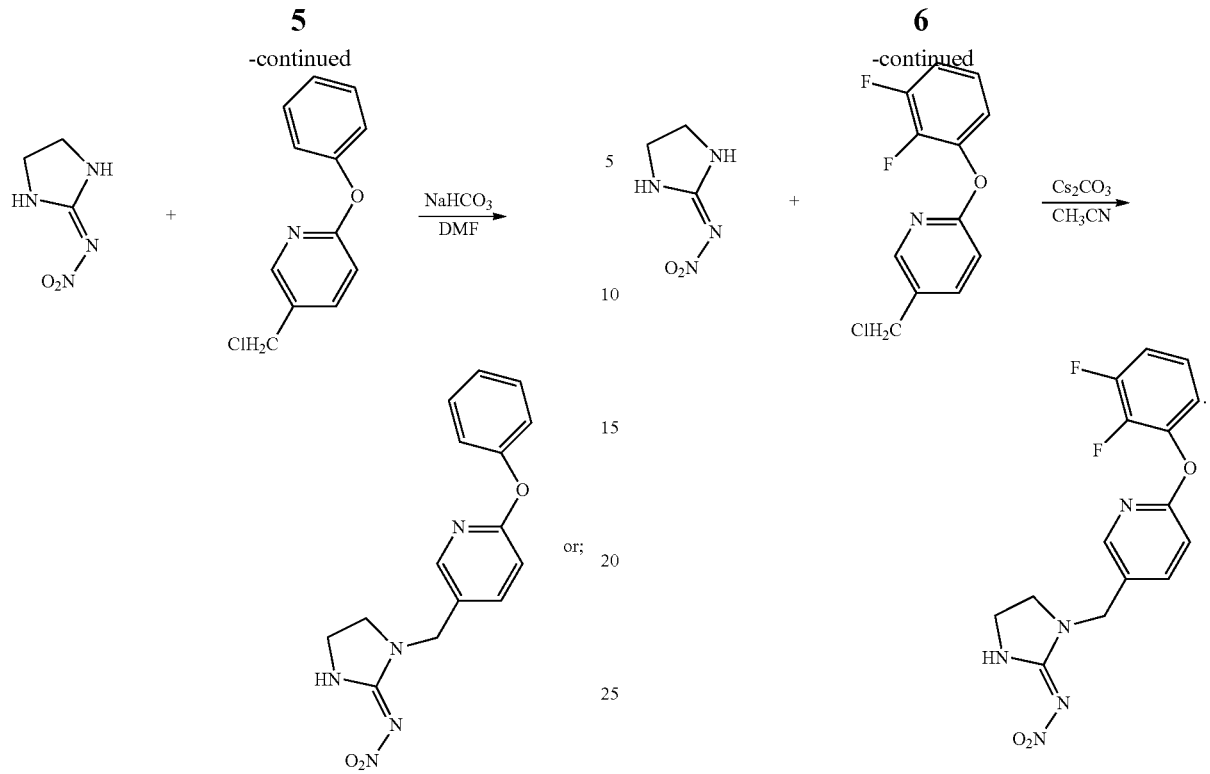

The compound of the general formula I has a good insecticidal effect on pests such as *Mythimna separata*, so the compound of the present disclosure can be used to prepare insecticides to protect plants such as agriculture and horticulture. Of course, the harmful organisms that can be controlled by the compound of the present disclosure are not limited to the range exemplified above.

When the compound of the present disclosure represented by the general formula I is used as an insecticide in the fields of agriculture, horticulture, etc., it can be used alone or in the form of an insecticidal composition, e.g. emulsions in water, suspensions, water dispersible granules, emulsifiable concentrates prepared by the compound represented by formula I as the active ingredient and the insecticide adjuvants commonly used in the field.

The commonly used insecticide adjuvants include liquid carriers, such as water; organic solvents, such as toluene, xylene, cyclohexanol, methanol, butanol, ethylene glycol, acetone, dimethylformamide, acetic acid, dimethyl sulfoxide, animal and vegetable oils and fatty acids; commonly used surfactants, such as emulsifiers and dispersants, including anionic surfactants, cationic surfactants, nonionic surfactants and amphoteric surfactants; and other adjuvants, such as humectants and thickeners.

When the compound of the present disclosure represented by the general formula I is used as an active ingredient in an insecticide, the content in the insecticide is selected in the range of 0.1%-99.5%, and the appropriate active ingredient content can be determined according to the preparation form and application method. Usually, the emulsion in water contains 5%-50% (weight percentage, the same below) of the active ingredient, preferably 10%-40%; and the suspension contains 5%-50% of the active ingredient, preferably 5%-40%.

For the use of the insecticide of the present disclosure, the application method comprises spraying on the stems and leaves, applying on the water surface, soil treatment and seed treatment. For example, when using the method of spraying on the stems and leaves, the compound represented by the general formula I as the active ingredient can be used in emulsions in water, suspensions, water dispersible granules, emulsifiable concentrates in the concentration range of 1-1000 μg/mL, preferably 1-500 μg/mL.

The 2-substituted imidazolidine derivative containing an aryl bipyridyloxy structure disclosed in the present disclosure has good insecticidal activity against pests such as *Mythimna separata,* and can therefore be used to prepare insecticides used in the fields of agriculture, horticulture, etc.

DETAILED DESCRIPTION OF THE EMBODIMENTS

The above technical scheme will be further described below in conjunction with specific embodiments. It should be understood that these embodiments are used to illustrate the present disclosure and not to limit the scope of the present disclosure. The implementation conditions used in the examples can be further adjusted according to the conditions of specific manufacturers, and implementation conditions not specified are usually conditions in routine experiments.

EXAMPLE 1

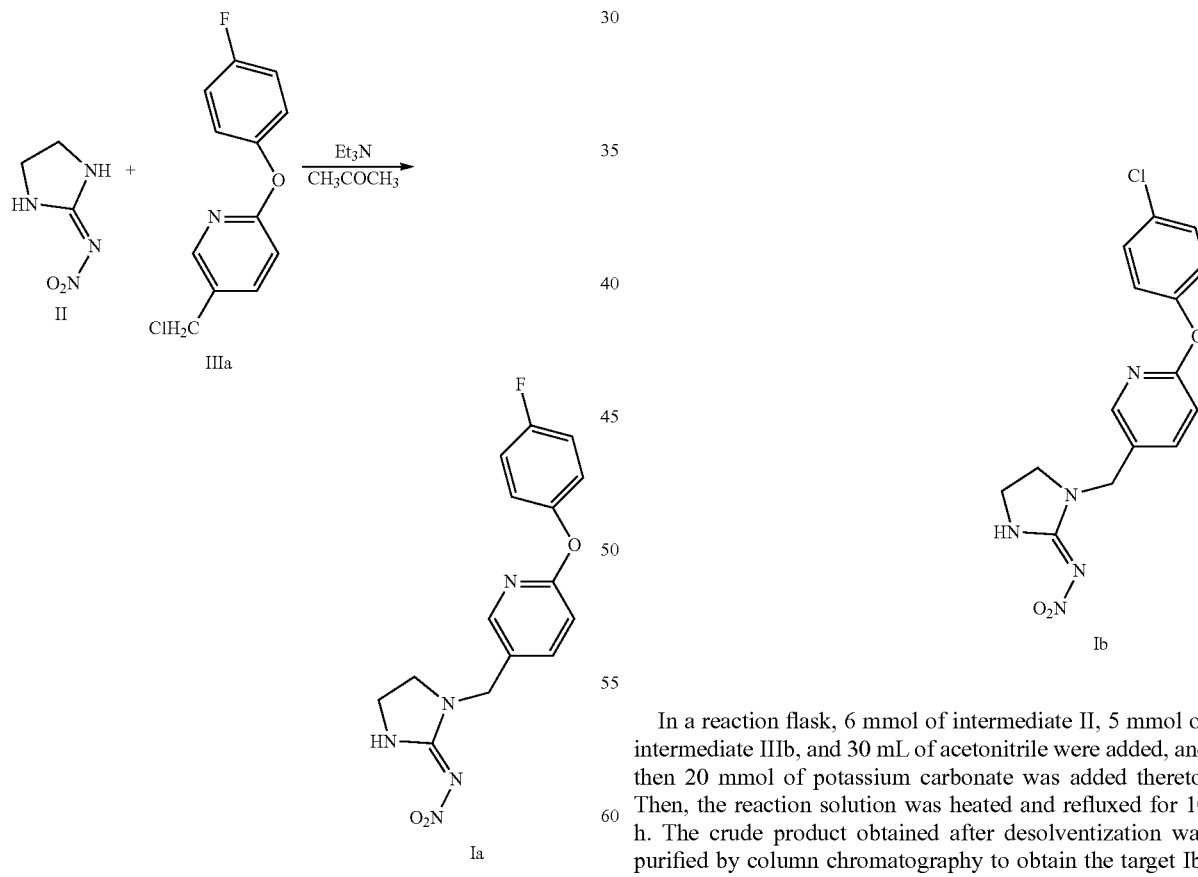

In a reaction flask, 7 mmol of intermediate II, 8 mmol of intermediate IIIa, and 30 mL of acetone were added, and then 50 mmol of trimethylamine was added thereto. Then, it was heated and refluxed for 12 h. The crude product obtained after desolventization was purified by column chromatography to obtain the target Ia; $^1$H NMR (400 MHz, CDCl$_3$): δ 8.17 (s, 1H, NH), 8.06 (s, 1H, Py-H), 7.72-7.75 (m, 1H, Py-H), 7.09 (d, J=6.4 Hz, 4H, Ar—H), 6.93 (d, J=8.4 Hz, 1H, Py-H), 4.50 (s, 2H, CH$_2$), 3.77 (t, J=9.2 Hz, 2H, CH$_2$), 3.50 (t, J=9.2 Hz, 2H, CH$_2$).

EXAMPLE 2

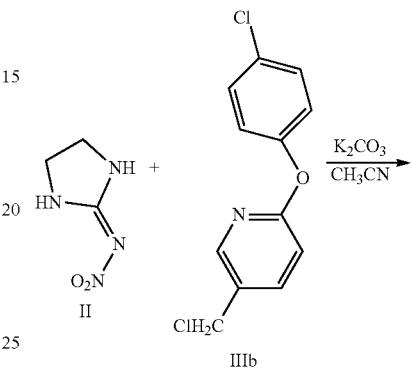

In a reaction flask, 6 mmol of intermediate II, 5 mmol of intermediate IIIb, and 30 mL of acetonitrile were added, and then 20 mmol of potassium carbonate was added thereto. Then, the reaction solution was heated and refluxed for 10 h. The crude product obtained after desolventization was purified by column chromatography to obtain the target Ib; $^1$H NMR (400 MHz, CDCl$_3$): δ 8.17 (s, 1H, NH), 8.07 (d, J=2.0 Hz, 1H, Py-H), 7.73-7.76 (m, 1H, Py-H), 7.36 (d, J=8.8 Hz, 2H, Ar—H), 7.08 (d, J=8.8 Hz, 2H, Ar—H), 6.95 (d, J=8.4 Hz, 1H, Py-H), 4.50 (s, 2H, CH$_2$), 3.77 (t, J=9.2 Hz, 2H, CH$_2$), 3.50 (t, J=9.2 Hz, 2H, CH$_2$).

EXAMPLE 3

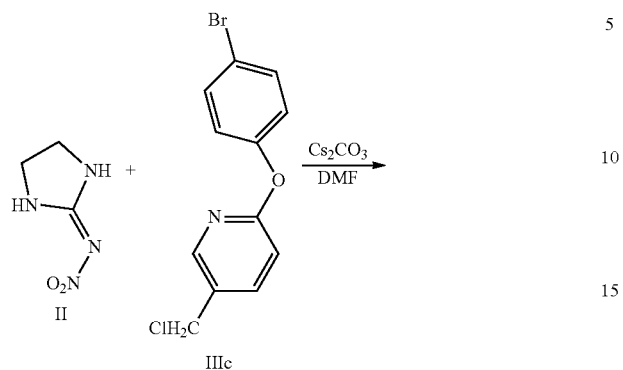

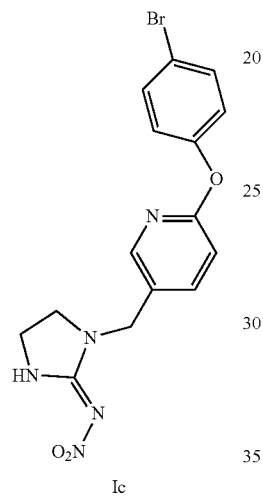

In a reaction flask, 8 mmol of intermediate II, 8 mmol of intermediate IIIc, and 35 mL of DMF were added, and then 20 mmol of cesium carbonate was added thereto. Then, the reaction solution was heated to 80° C. and reacted for 15 h. The crude product obtained after desolventization was purified by column chromatography to obtain the target Ic; $^1$H NMR (400 MHz, CDCl$_3$): δ 8.17 (s, 1H, NH), 8.07 (s, 1H, Py-H), 7.75 (d, J=8.0 Hz, 1H, Py-H), 7.51 (d, J=8.4 Hz, 2H, Ar—H), 7.03 (d, J=8.8 Hz, 2H, Ar—H), 6.95 (d, J=8.4 Hz, 1H, Py-H), 4.50 (s, 2H, CH$_2$), 3.78 (t, J=8.4 Hz, 2H, CH$_2$), 3.51 (t, J=8.4 Hz, 2H, CH$_2$).

EXAMPLE 4

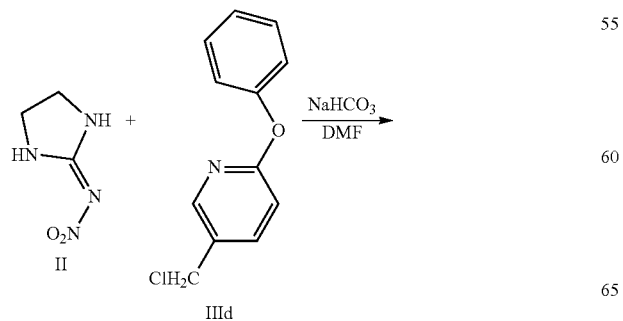

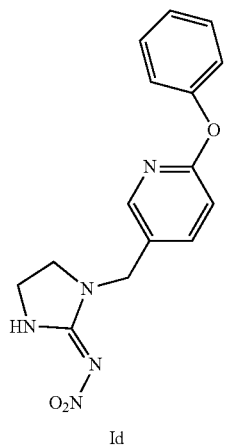

In a reaction flask, 8 mmol of intermediate II, 9 mmol of intermediate IIId, and 30 mL of DMF were added, and then 30 mmol of sodium bicarbonate was added thereto. Then, the reaction solution was heated to 80° C. and reacted for 18 h. The crude product obtained after desolventization was purified by column chromatography to obtain the target Id; $^1$H NMR (400 MHz, CDCl$_3$): δ 8.17 (s, 1H, NH), 8.08 (d, J=2.4 Hz, 1H, Py-H), 7.71-7.73 (m, 1H, Py-H), 7.39-7.43 (m, 2H, Ar—H), 7.20-7.24 (m, 1H, Ar—H), 7.13 (d, J=7.6 Hz, 2H, Ar—H), 6.92 (d, J=8.8 Hz, 1H, Py-H), 4.50 (s, 2H, CH$_2$), 3.76 (t, J=9.2 Hz, 2H, CH$_2$), 3.50 (t, J=9.2 Hz, 2H, CH$_2$).

EXAMPLE 5

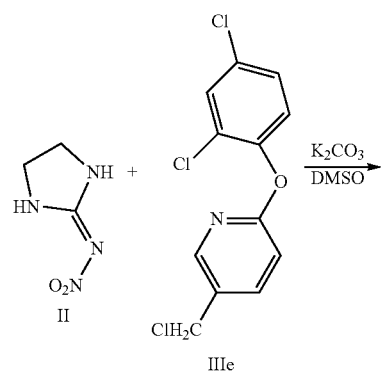

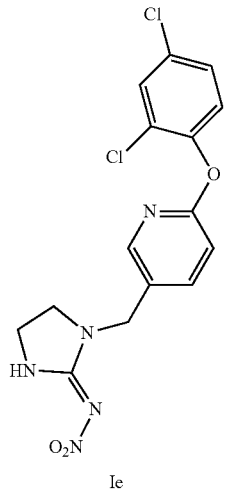

In a reaction flask, 4 mmol of intermediate II, 5 mmol of intermediate IIIe, and 35 mL of DMSO were added, and then 10 mmol of potassium carbonate was added thereto. Then, the reaction solution was heated to 85° C. and reacted for 22 h. The crude product obtained after desolventization was purified by column chromatography to obtain the target Ie; $^1$H NMR (400 MHz, CDCl$_3$): δ 8.17 (s, 1H, NH), 8.02 (d, J=2.0 Hz, 1H, Py-H), 7.75-7.78 (m, 1H, Py-H), 7.48 (d, J=2.4 Hz, 1H, Ar—H), 7.28-7.31 (m, 1H, Ar—H), 7.15 (d, J=8.8 Hz, 1H, Ar—H), 7.02 (d, J=8.8 Hz, 1H, Py-H), 4.50 (s, 2H, CH$_2$), 3.78 (t, J=9.2 Hz, 2H, CH$_2$), 3.51 (t, J=9.2 Hz, 2H, CH$_2$).

EXAMPLE 6

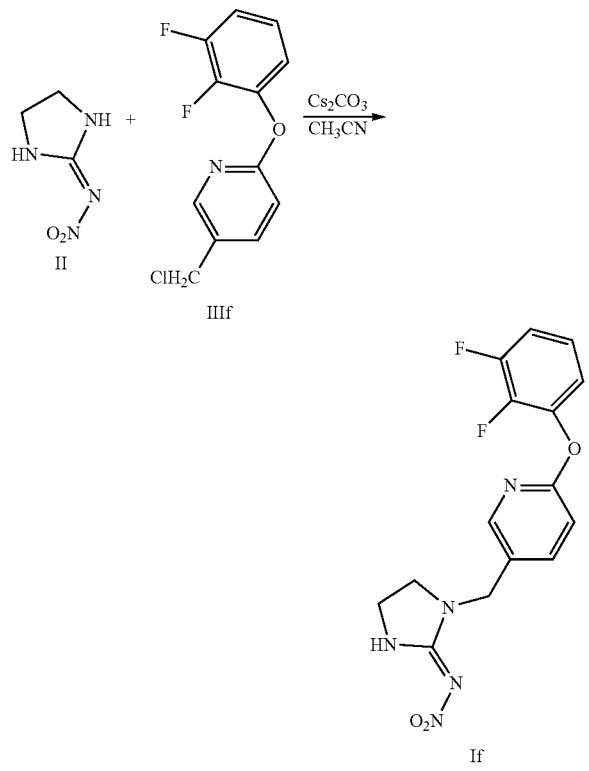

In a reaction flask, 10 mmol of intermediate II, 11 mmol of intermediate IIIf, and 30 mL of acetonitrile were added, and then 30 mmol of cesium carbonate was added thereto. Then, the reaction solution was heated and reacted for 8 h. The crude product obtained after desolventization was purified by column chromatography to obtain the target If; $^1$H NMR (400 MHz, CDCl$_3$): δ 8.16 (s, 1H, NH), 8.04 (d, J=2.0 Hz, 1H, Py-H), 7.76-7.79 (m, 1H, Py-H), 7.03-7.13 (m, 4H, Ar—H and Py-H), 4.51 (s, 2H, CH$_2$), 3.77 (t, J=9.2 Hz, 2H, CH$_2$), 3.50 (t, J=9.2 Hz, 2H, CH$_2$).

EXAMPLE 7

Screening of Insecticidal Activity of Compounds Against *Mythimna separate*

Adopting the leaf soaking method proposed by the International Resistance Action Committee (IRAC): the test target is *Mythimna separata*, e.g. the appropriate amount of corn leaves was fully infiltrated in the prepared liquid and then dried naturally in the shade, and placed in a petri dish with a filter paper. The 3rd instar larvas of *Mythimna separata* were added 10 heads per dish, cultured in the observation room at 24-27° C., and the results were investigated after 48 h. Using a brush to touch the body of the *Mythimna separata*, if there is no response, it is regarded as a dead insect. The test concentration is 500 μg/mL (the other concentrations of the drug solution can be obtained by diluting the drug solution with the concentration of 500 μg/mL).

The insecticidal activity of compounds Ia-If are shown in Table 1. When the tested concentration is 500 μg/mL, the compounds Ia-If have good insecticidal effects on *Mythimna separata*, and the insecticidal activities are 100%, 100%, 80%, 100%, 100% and 100%, respectively.

TABLE 1

Insecticidal activity of compound Ia-If

| compound | concentration (μg/mL) | death rate % *Mythimna separata* |
|---|---|---|
| I a | 500 | 100 |
| I b | 500 | 100 |
| I c | 500 | 80 |
| I d | 500 | 100 |
| I e | 500 | 100 |
| I f | 500 | 100 |

The above experimental results show that the aryl bipyridyloxy group and the 2-substituted imidazolidine unit are organically combined, and the new compound obtained has good insecticidal activity.

The basic principles, main features and advantages of the present disclosure have been shown and described above. Those skilled in the industry should understand that the present disclosure is not limited by the above examples. The above examples and descriptions only illustrate the principles of the present disclosure. The present disclosure will have various changes without departing from the spirit and scope of the present disclosure. These changes and improvements fall within the scope of the claimed disclosure. The scope of protection claimed by the present disclosure is defined by the appended claims and their equivalents.

What is claimed is:

1. A 2-substituted imidazolidine derivative containing an aryl bipyridyloxy structure, the 2-substituted imidazolidine derivative having the following structure:

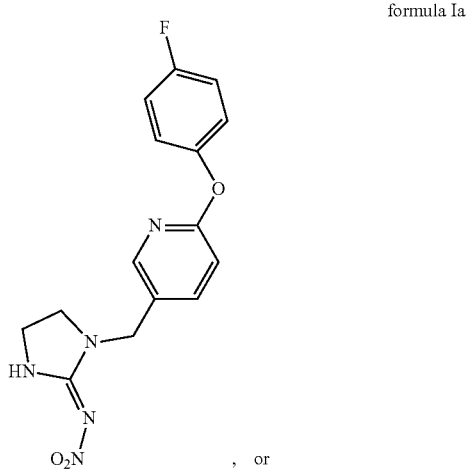

formula Ia

, or formula Ib
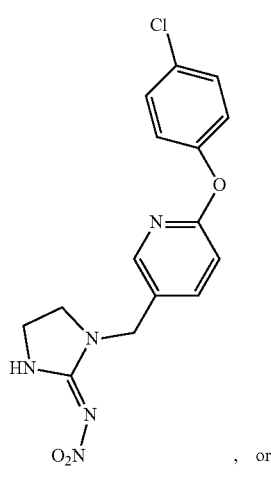
, or
formula Ic
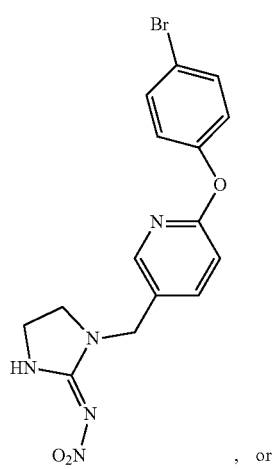
, or
formula Id
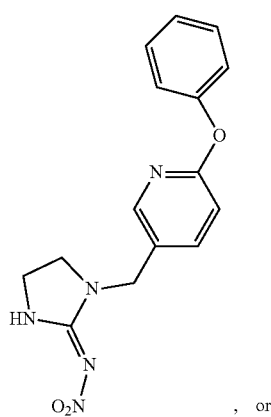
, or
formula Ie
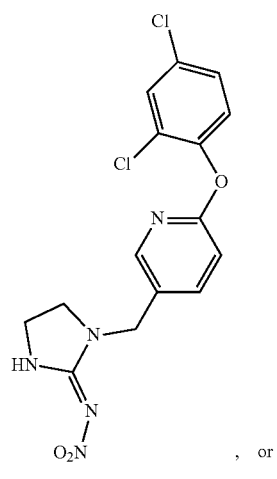
, or
formula If
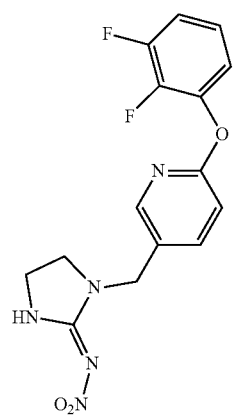
.
2. A method for preparing the 2-substituted imidazolidine derivative containing the aryl bipyridyloxy structure according to claim 1, wherein the method is as follows:
method 1
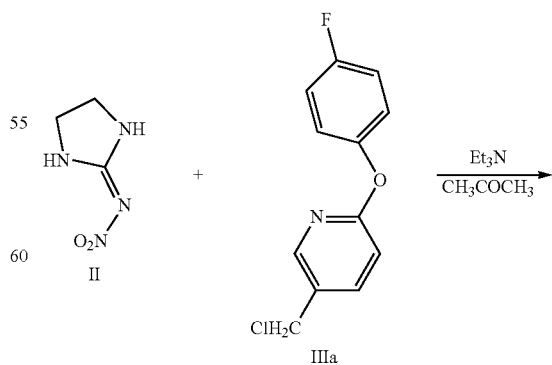

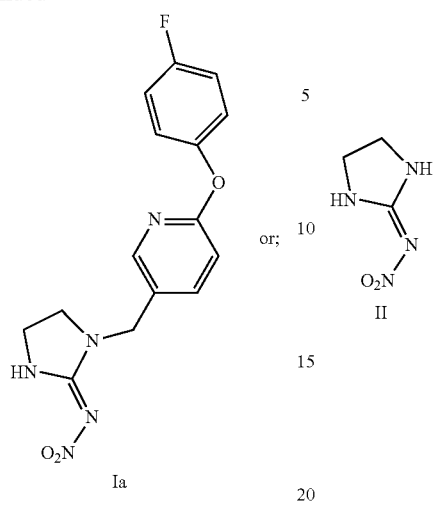
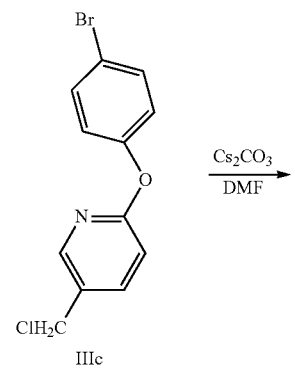
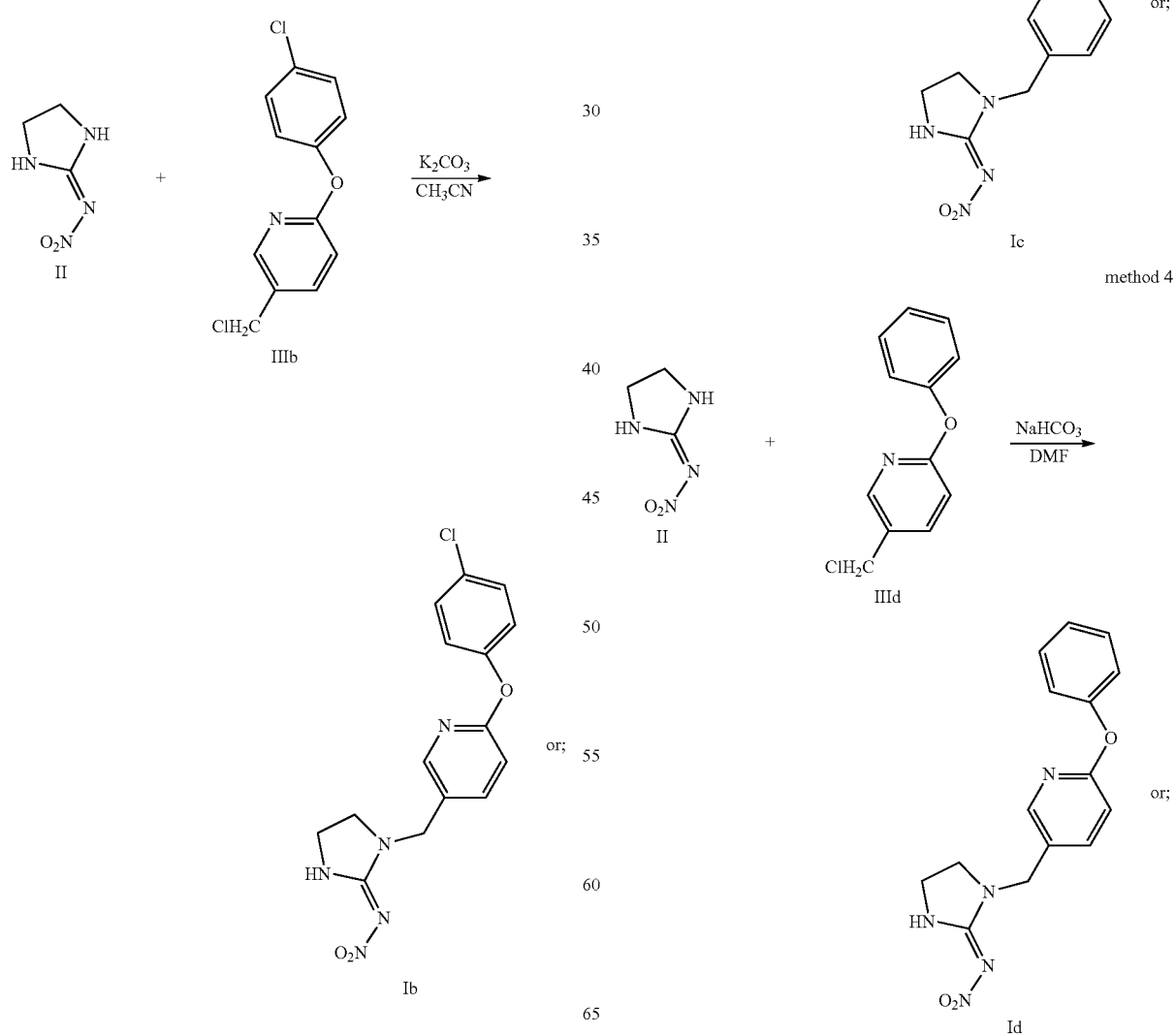

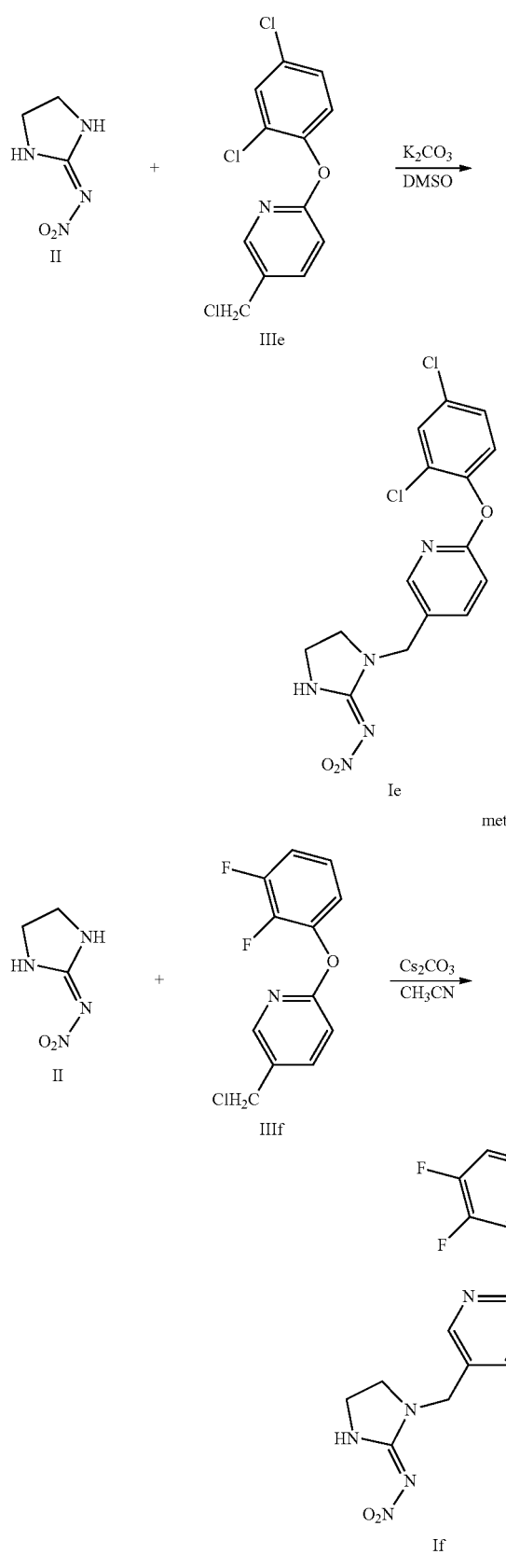

3. The method according to claim 2, wherein the method 1 is as follows: adding 7 mmol of intermediate II, 8 mmol of intermediate IIIa, and 30 mL of acetone, and then adding 50 mmol of triethylamine; then heating the reaction solution to reflux for 12 h; and purifying the crude product obtained after desolventization by column chromatography to obtain the target Ia.

4. The method according to claim 2, wherein the method 2 is as follows: adding 6 mmol of intermediate II, 5 mmol of intermediate IIIb, and 30 mL of acetonitrile, and then adding 20 mmol of potassium carbonate; heating the reaction solution to reflux for 10 h; and purifying the crude product obtained after desolventization by column chromatography to obtain the target compound Ib.

5. The method according to claim 2, wherein the method 3 is as follows: adding 8 mmol of intermediate II, 8 mmol of intermediate IIIc, and 35 mL of DMF, and then adding 20 mmol of cesium carbonate; heating the reaction solution to 80° C. and reacting for 15 h; and purifying the crude product obtained after desolventization by column chromatography to obtain the target compound Ic.

6. The method according to claim 2, wherein the method 4 is as follows: adding 8 mmol of intermediate II, 9 mmol of intermediate IIId and 30 mL of DMF, and then adding 30 mmol of sodium bicarbonate; heating the reaction solution to 80° C. and reacting for 18 h; and purifying the crude product obtained after desolventization by column chromatography to obtain the target compound Id.

7. The method according to claim 2, wherein the method 5 is as follows: adding 4 mmol of intermediate II, 5 mmol of intermediate IIIe, and 35 mL of DMSO, and then adding 10 mmol of potassium carbonate; heating the reaction solution to 85° C. and reacting for 22 h; and purifying the crude product obtained after desolventization by column chromatography to obtain the target compound Ie.

8. The method according to claim 2, wherein the method 6 is as follows: adding 10 mmol of intermediate II, 11 mmol of intermediate IIIf and 30 mL of acetonitrile, and then adding 30 mmol of cesium carbonate; heating the reaction solution to reflux for 8 h; and purifying the crude product obtained after desolventization by column chromatography to obtain the target compound If.

9. An insecticidal composition comprising 2-substituted imidazolidine derivative according to claim 1 as an active ingredient and insecticide adjuvants, wherein the composition is in the form of emulsion in water, a suspension, a water dispersible granule, and an emulsifiable concentrate.

10. The insecticidal composition according to claim 9, wherein the insecticide adjuvants are selected from a liquid carrier, an organic solvent, surfactants, humectants and thickeners.

11. The insecticidal composition according to claim 10, wherein the liquid carrier is water; the organic solvent is slected from the group consisting of toluene, xylene, cyclohexanol, methanol, butanol, ethylene glycol, acetone, dimethylformamide, acetic acid, dimethyl sulfoxide, animal and vegetable oils and fatty acids; the surfactant is selected from the group consisting of an emulsifier and a dispersant; and an adjuvant selected from the group consisting of a humectant and thickener.

12. The insecticidal composition according to claim 10, wherein the surfactant is selected from the group consisting of an anionic surfactant, a cationic surfactant, a nonionic surfactant, and an amphoteric surfactant.

13. The insecticidal composition according to claim 9, wherein a weight content of the 2-substituted imidazolidine derivative as the active ingredient in the insecticidal composition is 0.1%-99.5%.

14. The insecticide composition according to claim 9, wherein the emulsion in water contains 5%-50% of the active ingredient by weight.

15. The insecticide composition according to claim 9, wherein the suspension contains 5%-50% of the active ingredient by weight.

* * * * *